(12) United States Patent
Thisted

(10) Patent No.: US 8,994,200 B2
(45) Date of Patent: Mar. 31, 2015

(54) POWER SYSTEM FREQUENCY INERTIA FOR POWER GENERATION SYSTEM

(75) Inventor: Jan Thisted, Tjele (DK)

(73) Assignee: Siemens Aktiengesellschaft, München (DE)

( * ) Notice: Subject to any disclaimer, the term of this patent is extended or adjusted under 35 U.S.C. 154(b) by 122 days.

(21) Appl. No.: 13/145,131

(22) PCT Filed: Mar. 10, 2009

(86) PCT No.: PCT/EP2009/052746
§ 371 (c)(1),
(2), (4) Date: Dec. 1, 2011

(87) PCT Pub. No.: WO2010/086032
PCT Pub. Date: Aug. 5, 2010

(65) Prior Publication Data
US 2012/0061963 A1 Mar. 15, 2012

(30) Foreign Application Priority Data
Jan. 30, 2009 (EP) .................................... 09001339

(51) Int. Cl.
| *F03D 9/00* | (2006.01) |
| *H02P 9/04* | (2006.01) |
| *F03D 7/02* | (2006.01) |
| *H02J 3/06* | (2006.01) |
| *H02J 3/38* | (2006.01) |
| *H02J 3/46* | (2006.01) |
| *H02P 9/00* | (2006.01) |

(52) U.S. Cl.
CPC ................ *H02P 9/04* (2013.01); *F03D 7/0284* (2013.01); *F03D 9/003* (2013.01); *H02J 3/06* (2013.01); *H02J 3/386* (2013.01); *H02J 3/46* (2013.01); *F05B 2270/337* (2013.01); *H02P 2009/004* (2013.01); *Y02E 10/723* (2013.01); *Y02E 10/725* (2013.01); *Y02E 10/763* (2013.01)
USPC .............................................. 290/44; 290/55

(58) Field of Classification Search
USPC .................................... 290/44, 55; 322/20, 44
See application file for complete search history.

(56) References Cited

U.S. PATENT DOCUMENTS

| 4,400,659 A | 8/1983 | Barron et al. |
| 7,042,110 B2 * | 5/2006 | Mikhail et al. .................. 290/44 |
| 2007/0085343 A1 | 4/2007 | Fortmann |

FOREIGN PATENT DOCUMENTS

| CN | 1630157 A | 6/2005 |
| CN | 18792575 A | 12/2006 |
| CN | 1976210 A | 6/2007 |
| CN | 101106279 A | 1/2008 |
| CN | 101162883 A | 4/2008 |

(Continued)

*Primary Examiner* — Tulsidas C Patel
*Assistant Examiner* — Thomas Quigley

(57) ABSTRACT

A power generation system is provided. The power generation system including a power generation unit operable to supply electrical power to an utility system; a synchronous machine coupled to the utility system; a grid measurement device arranged for measuring the current and power that is exchanged between the synchronous machine and the utility system; a controller for adjusting the output power of the power generation unit as a function of the power and current that is measured by the grid measurement device; and a communication link between the grid measurement device, controller and/or the power generation unit. The power generation unit is configured to provide current and power to the utility system as a function of the power and current that is measured by the grid measurement device.

19 Claims, 3 Drawing Sheets

(56) References Cited

FOREIGN PATENT DOCUMENTS

Figure 1:
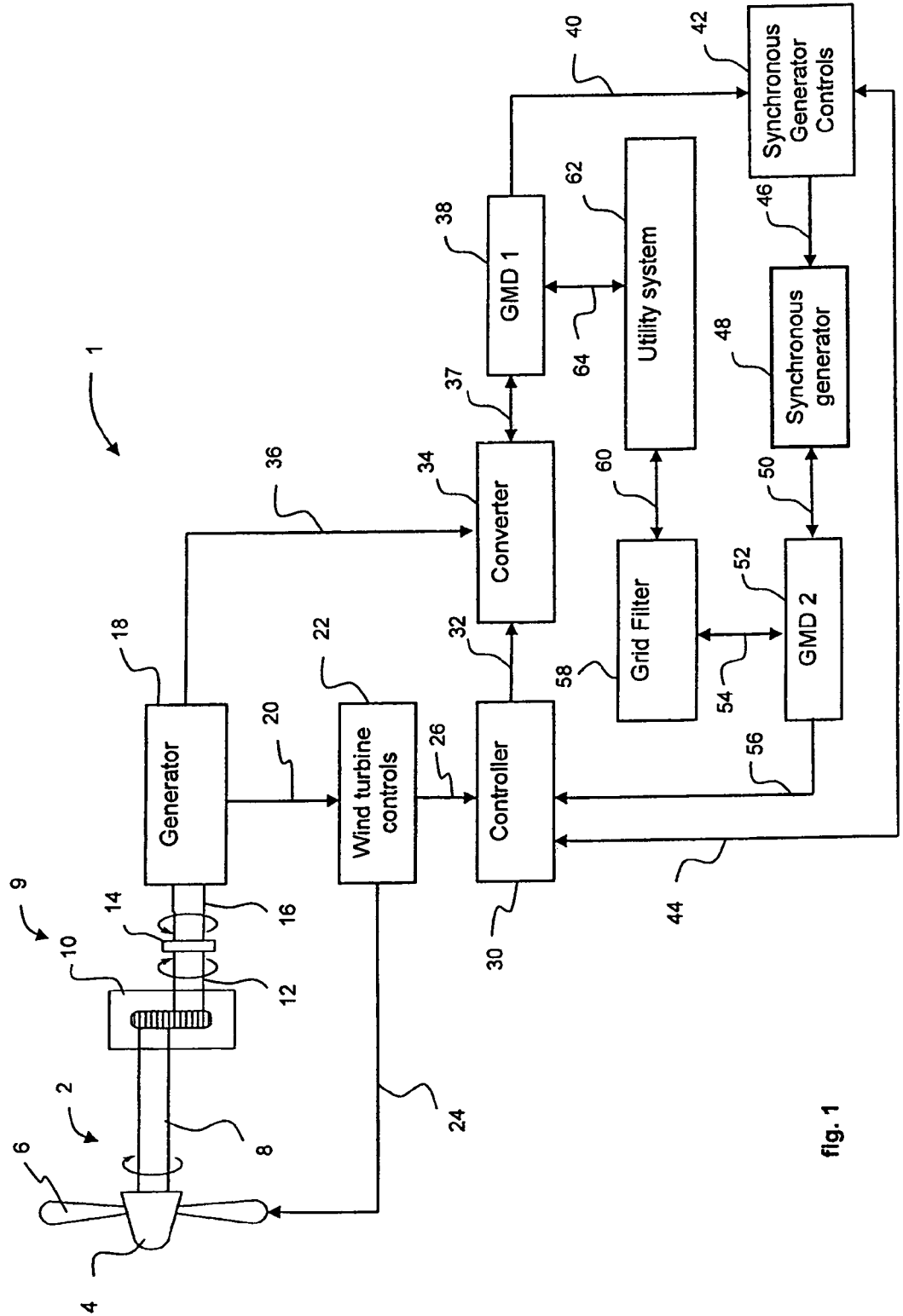

| EP | 1746285 | A2 | 1/2007 |
| EP | 1790850 | A1 | 5/2007 |
| GB | 2330256 | A | 4/1999 |
| JP | 1169893 | A | 7/1989 |

* cited by examiner

POWER SYSTEM FREQUENCY INERTIA FOR POWER GENERATION SYSTEM

CROSS REFERENCE TO RELATED APPLICATIONS

This application is the US National Stage of International Application PCT/EP2009/052746 filed Mar. 10, 2009 and claims benefit thereof. The international Application claims priority of European Patent Office application No. 09001339.2 EP filed Jan. 30, 2009 which is incorporated by reference herein in its entirety.

BACKGROUND OF THE INVENTION

The invention relates generally to the field of power generation units used for power generation for utility grids, and more particularly to techniques for ensuring grid compliance of power generation units, including stabilizing power during transient conditions.

An increasing number of power generation units such as wind turbines, solar cells, fuel cells, wave power systems or the like are connected to the utility grid. The need for frequency support for the utility grid becomes greater as the conventional power plants comprising large synchronous generators are replaced by power generation units such as wind turbines. The power generation units are connected to the utility grid using power electronics, and the direct link between power and frequency is lost, whereby the disturbances on the grid might result in larger frequency deviations. The challenge for a wind turbine is used in the following in order to describe the background of the invention. However, the challenges are similar for other types of power generation units such as solar cell, fuel cell, micro turbine, wave power or the like where the interface between the utility grid and the power generation unit is based on a power converter.

A wind turbine generator generally includes a wind rotor that converts wind energy into rotational motion of a turbine shaft, which in turn drives the rotor of an electrical generator to produce electrical power. Modern wind turbine generator installations typically take the form of a wind farm having multiple wind turbine generators connected to a common wind farm power grid. This wind farm grid is connected to a utility grid, either directly or through a substation which may include a step-up transformer.

Individual wind turbines and wind farms are required to comply with the power quality requirements of the utility system operator. Such power quality requirements, often designated as "grid requirements" may typically include voltage regulation, frequency regulation, active and reactive power control, fault ride-through, and in some cases also power ramping and the provision of spinning reserve or inertia in case of transient conditions caused by sudden failure of generation, line fault or connection of rapid application of large loads.

From a utility point of view it would be preferable if wind turbine generators could be fitted with classical synchronous generators having the same regulation capabilities as the synchronous generators applied at large hydro or thermal power plants. Such classical synchronous generators are capable of regulating voltage, active and reactive power etc. In transient conditions, the synchronous generators may also provide additional control services that modulate active power to stabilize the power system and restore frequency to its nominal value.

However, classical synchronous generators are not well suited for use on wind turbines, since their very stiff characteristics are not compatible with wind turbine application. In order to approximate synchronous generator operation and capabilities modern wind turbine generators typically use power electronic inverters to interface the wind turbine generator output with the utility grid. In one common approach the wind turbine generator output is directly fed to a power electronic converter, where the turbine frequency is rectified and inverted into a fixed frequency as needed by the utility system. An alternative approach uses a doubly fed asynchronous generator (DFAG) with a variable frequency power electronic inverter exciting the DFAG rotor and stator windings being coupled directly to the utility system.

Traditionally, wind turbine generators have been configured to respond to the grid requirements through the use of a combination of grid measurement devices, utility signals, and response references and algorithms internal to the turbine controller.

This arrangement has a number of drawbacks. Firstly, the wind turbine generator response to grid requirements generally becomes a black box seen from the perspective of the system operator. Secondly, feed-back response elements may occur where the wind turbine generator system regulates in response to self-created artifacts. Furthermore, in the normal configuration wind turbines do not contribute to the frequency stabilization of the utility system.

The purpose of the invention is to overcome the above mentioned limitations for power generation units and to provide control techniques so that the power generation unit can meet the grid requirements in a way that is transparent to system operators, including contributing to frequency regulation and power-swing stabilization for the utility system.

DESCRIPTION OF THE INVENTION

An exemplary embodiment of the invention includes a power generation system comprising of at least one power generation unit operable to supply electrical power to a utility system, and at least one synchronous machine that is operated in parallel to the power generation unit. The power generation unit is interfaced to the utility system using a power converter.

A grid measurement device is located between the synchronous machine and the grid in order to measure the current and power exchanged between the synchronous generator and the grid. The output of the grid measurement device is by means of communication transmitted to a controller that is arranged for adjusting the output power of the power generation unit as a function of the power and current that is measured by the grid measurement device. The controller is in one embodiment of the invention an integrated part of an internal controller for the power generation unit an such as an internal wind turbine controller or the like. In another embodiment the controller is an external controller using means of communication between the controller and the power generation unit. The power generation unit is configured to provide current and power to the utility system as a function of the output of the grid measurement device and this way contributing to the stabilization of the grid frequency in case of imbalance.

The power generation unit is in a preferred embodiment of the invention one of the following types a wind turbine generator, solar cell, fuel cell, micro turbine, wave power or other power generation units having a power converter interface to the grid.

In a preferred embodiment of the invention the power generation system comprises of a number of power generation units operated in parallel such as wind turbines in a wind farm. In a further embodiment the power generation system comprises of a number of synchronous machines operated in parallel with the power generation units for grid support.

The present invention combines the advantages of the inherent inertia response of the synchronous generator with the possibility of controlling the output power from the power generation unit such as a wind turbine. The power generation unit is configured to provide current and power to the utility system as a function of the power and current flow that is exchanged between the synchronous generator and the grid. The flow of power and current that is exchanged between the synchronous generator and the grid is affected during dynamic conditions such as load imbalances. The measurement of the power and current flow is in proportion to the imbalance of the grid, and the measurement is hereby used to adjust the output power of the power generation unit for stabilization in response to the imbalance of the utility grid.

The arrangement combines the inherent inertia response of the synchronous machine with the possibility of increasing or decreasing the output power of the power generation unit for a fast stabilization and restoration of the grid frequency. The inertia response of the synchronous machine is continuously contributing to the stabilization of the grid, and no control action is needed in order to provide inertia response in an initial phase of a grid disturbance. Furthermore, the inertia response of the synchronous generator prevents that excessive control action for the power generation unit is set in case of a minor frequency disturbance on the utility grid. The initial phase of a frequency disturbance is immediately followed by adjusting the output power of the power generation unit by using the power and current measurements from the grid measurements device. The output power of the power generation unit can be changed very fast, and it is hereby possible to support the grid in a controlled and efficient manner and in proportion of imbalance. The combination of the synchronous machine and the output power the turbine also provides a fast response to a deviation of the grid frequency.

For example, A relatively large amount of kinetic energy is stored in the rotor of a wind turbine which can be transformed in to electrical power during a grid disturbance. The inertia constant H for a wind turbine is calculated by the following formula:

$$H = (\tfrac{1}{2} J w^2)/(\text{rated } MW) s$$

A typical constant can be in the range of 5 to 10 seconds. The inertia constant express the kinetic energy that is stored in the rotor system at nominal rotor speed. For a rotor system with H=7 the rotor can store kinetic energy equal to nominal rated power for 7 seconds. This is in range of 1-2 times the energy that is stored in a typical synchronous generator for thermal power plants. This way, the inertia response of the synchronous generator and the controllable use of the kinetic energy in the rotor are combined for a very effective and fast stabilization of the grid frequency. Furthermore, a faster restoration of the grid frequency is also achieved.

Due to the use of the synchronous generator it is possible to provide inertia response even in situations where it is impossible to increase or decrease the output power of the wind turbine. For instance in low wind scenarios where the wind turbine is running at a lower speed limit or in high wind situations where maximum power is provided by the wind turbine.

Frequency variations are often short and the inertia response normally has a short duration from 3 power cycles to 10 sec. A power generation unit such as a wind turbine might be configured to provide more power than rated for a short while, and the power generation unit can hereby be used to provide power to the grid when rated power is produced before and during a frequency drop.

The synchronous machine is preferably operated in a no load/idling condition where the only flow of power between the synchronous machine and the grid, in steady state condition, is due to the losses in the generator such as friction etc. In another embodiment of the invention active power generation and a prime mover control system is used for power swing stabilization. The invention allows that the size of the synchronous machine is chosen in order to meet the local requirements for frequency stabilization. The invention hereby provides a solution for designing a power generation system with an effective frequency stabilization, which corresponds to the inertia response of conventional hydro or thermal power plant. This way, it becomes very attractive for utility company's to replace conventional power plants with a power generation system such as a wind power system or the like. The utility companies have until now hesitated to replace conventional power plants due to the lack of inertia response and reduced frequency support. Furthermore, the synchronous machine provides dynamic voltage regulation for the grid, which is important for charging control of long AC submarine cables in offshore wind farms.

The behavior of the power generation system becomes much more transparent for the system operators when compared to systems where the frequency stabilization is relying on control of power converters only.

In an embodiment of the invention a micro synchronous machine with a relative high inertia is connected to the power system. The synchronous machine is rotating without any mechanical load and an active power transducer is applied as a grid measurement device for detection of rate of change of frequency. The signal from the active power transducer is used as an offset for the active power losses and the signal is hereby representing the rate of change of frequency. The signal is applied for control purposes for power converter systems for counteracting rate of change of frequency on power system frequencies.

The synchronous machine might be installed at or nearby a substation of a wind farm. The synchronous machine can be installed either offshore or onshore when operated in parallel with one or more wind turbines that is installed offshore.

The synchronous machine is in an embodiment of the invention operated substantially in a manner similar to the operation of synchronous generators applied at large hydro or thermal power plants. The operation control strategy of the synchronous machine may comprise frequency control, power oscillations damping control, voltage control or reactive power control.

In a preferred embodiment of the invention the output of the grid measurement device comprises of a measurement signal that is in proportion to the flow of power and current that is exchanged between the synchronous machine and the utility grid. The measurement signal is used to increase or decrease the output power of the power generation unit in order to stabilize the overall utility system. The measurement signal is zero when the synchronous machine is in a steady state condition e.g. when the frequency and voltage of the utility system is inside the control limits during steady-state conditions. Under transient conditions, if the system frequency is decreasing the synchronous machine counteracts by trans-forming rotational kinetic energy into electrical power, which is then delivered to the utility system. The measurement signal is hereby used to increase the output power of the power generation unit in order to enhance stable operation. Similarly, when the system frequency is increasing the synchronous machine is consuming power and current for speeding up, and the measurement signal is then used to decrease the output power of the turbines in order to enhance stable operation of the utility system.

The measurement signal from the grid measurement device is in a preferred embodiment by means of communication transmitted to a controller that is arranged for adjusting the power reference of a power generation unit such as a wind turbine converter. The measurement signal from the grid measurement device may be continuous or discrete and may be implemented as a closed or open loop function, subject to certain system limits. The means of communication between the grid measurement device and the controller could be based on wired or wireless infrastructure.

The controller is in an embodiment of the invention an integrated part of a wind turbine controller of the wind turbine. However, the controller could also be an external controller that is a part of a supervisory controller for adjusting the output power of one or more power generation units such as wind turbines that is located in a wind farm, and means of communication is hereby used for communication between the controller and the turbine.

In a further embodiment of the invention the controller uses a control technique that increases or decreases the power output as a function of a number of inputs from the grid measurement device. In one embodiment the input signals comprises of 1) A power reference signal from a dedicated controller for the power generation unit 2) the measurement signal from the grid measurement device and 3) An external power reference signal, which is used as a power reference signal for the controller in order to stabilize and restore the frequency of the grid at nominal frequency e.g. 50 or 60 Hz. The controller is thus configured for modulating flow of power through the converter of the power generation unit in response to frequency disturbances or power oscillations of the utility system.

In another embodiment of the invention the controller is configured to provide a blade pitch control signal or a turbine speed control signal of a wind turbine in response to the frequency disturbances or power oscillations of the utility system as a function of the synchronous machine response to the utility system. The input signal for the controller could also comprise of a torque or a power signal that is a function of the synchronous machines response to the utility system.

A limit function is in an exemplary embodiment additionally employed in the controller for physical limitation on the power generation system, such as a power limit, a torque limit, a current limit, an energy limit, or a speed limit etc. Limits are useful in order to ensure that the operation of the power generation unit is kept within the design limit of the mechanical, electrical and/or chemical system.

The grid measurement device is in a preferred embodiment of the invention located near the terminals of the synchronous machine in order to measure the current and power flow exchanged between the grid and synchronous machine. A grid filter can be arranged between the grid and the grid measurement device for reducing electrical noise such as harmonics from power converters etc. The grid filter comprises of a number of filter elements that effectively isolates the grid measuring device from measuring any feedback from other elements on the utility system, e.g. from a wind turbine converter. The grid filter allows the fundamental frequency voltage waveform of the utility system to pass from the utility system to the synchronous generator to ensure grid support during grid incidents and to avoid that excessive control action is set due to noise.

In an embodiment of the invention the main shaft of the synchronous machine is coupled to a motor such as a diesel engine, electro motor or the like. A small starter motor can be used for synchronization of the synchronous machine during startup. A prime mover can be used for simulation and test purposes for a power generation system such as a wind power system. In a further embodiment of the invention a combination of a prime mover, active power generation and a power system stabilizer control is used for stabilization of power swings.

In another embodiment of the invention the synchronous machine is connected to a controller in order to use the synchronous machine for generation or absorption of reactive power, and hereby providing the possibility for improved grid support.

In another embodiment of the invention the Power generation system comprises an energy storage element, an energy consumer element or combinations thereof, wherein the energy storage element, the energy consumer element or the combinations thereof are coupled to a converter.

In a preferred embodiment of the invention the synchronous machine is arranged as a synchronous generator.

FIGURES

The invention will be described in the following with reference to the figures in which FIG. 1 shows an embodiment of the invention comprising a wind turbine in connection with a synchronous generator.

Figure 2:
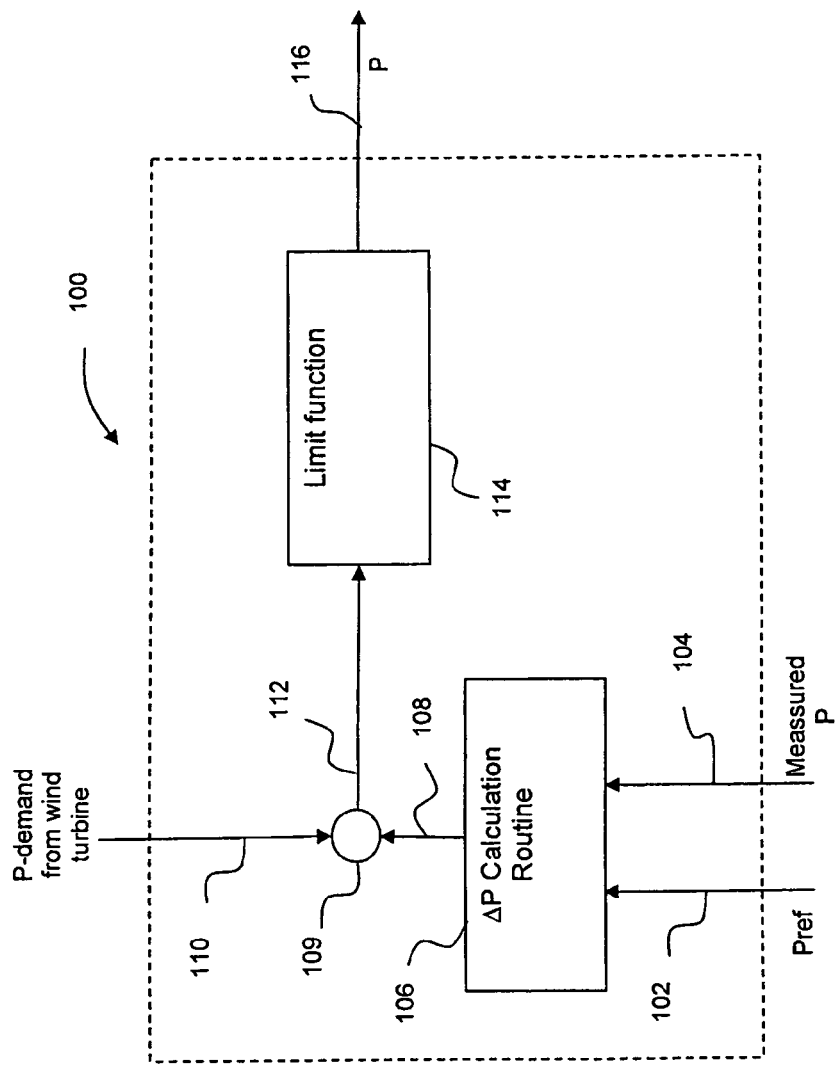

FIG. 2 shows a diagrammatic illustration of the controller.

Figure 3:
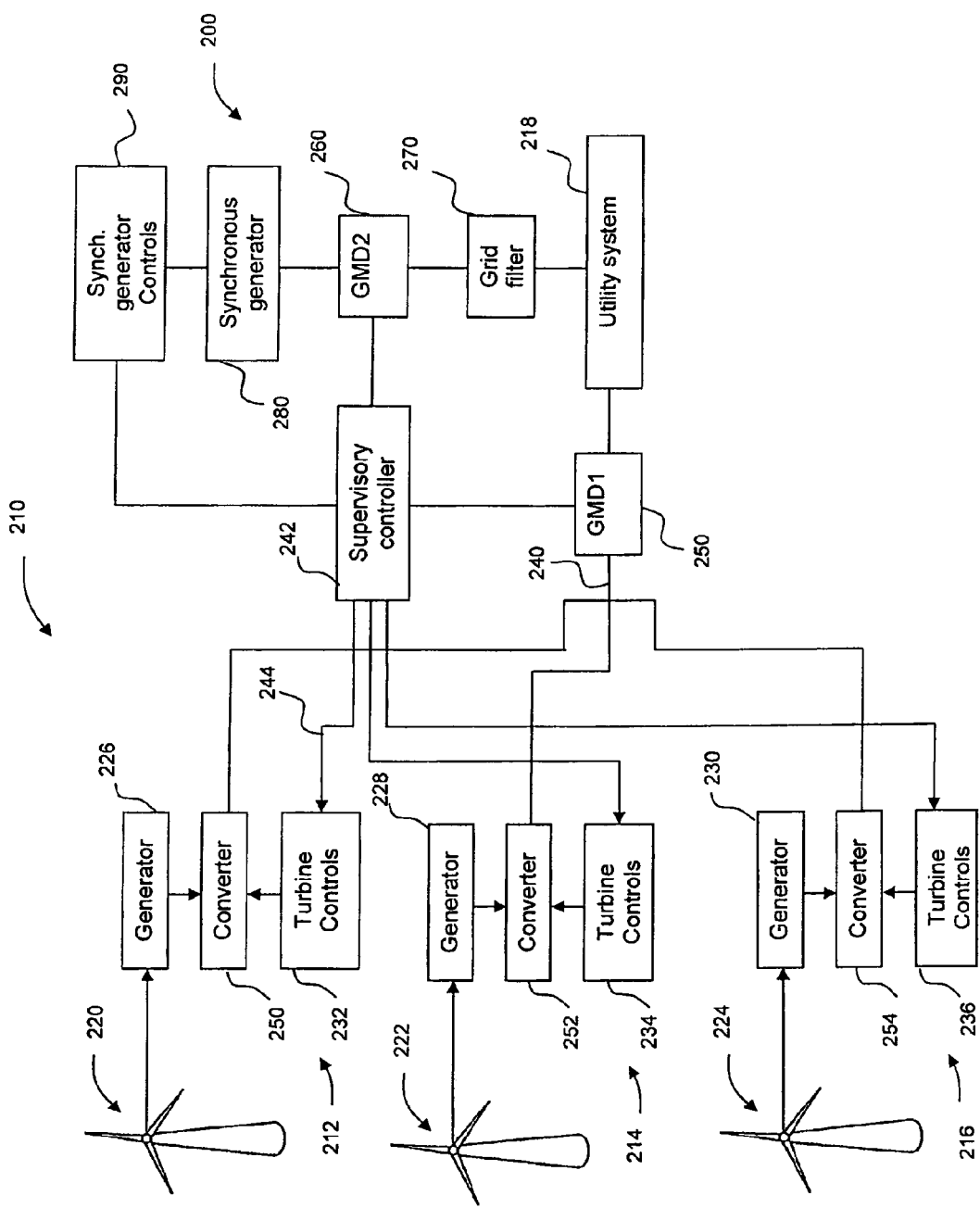

FIG. 3 a diagrammatical representation of a wind farm comprising a synchronous generator and control means for stabilizing power and frequency on the utility grid.

DETAILED DESCRIPTION

In the following a wind turbine system is used as an example of a power generation system, and a wind turbine is used as an example of a power generation unit. In other embodiments of the invention the power generation unit is a solar cell, fuel cell, micro turbine, wave power or a power generation units comprising a power converter interface to the grid Referring generally to FIG. 1, a wind turbine system 1 operable to generate electric power is provided. The wind turbine system 1 comprises a hub 4 having multiple blades 6. The blades 6 convert the mechanical energy of the wind into a rotational torque, which is further converted into electrical energy by the wind turbine system 1. The wind turbine system 1 further includes a turbine portion 2 that is operable to convert the mechanical energy of the wind into a rotational torque and a generator 18 that is operable to convert the rotational torque produced by the turbine portion 2 into electrical power. A drive train 9 is provided to couple the turbine portion 2 to the generator 18. The wind turbine generator 18 typically comprises a generator for use with a full converter. In a full conversion embodiment, the wind turbine generator stator windings are directly fed to the converter.

The turbine portion 2 includes a turbine rotor low-speed shaft 8 that is coupled to the hub 4. Rotational torque is transmitted from the rotor low-speed shaft 8 to a generator shaft 16 via the drive train 9. In certain embodiments, such as the embodiment illustrated in FIG. 1, the drive train 9 includes a gear box 10 transmitting torque from a low-speed shaft 12 to a high speed shaft 12. The high speed shaft 12 is coupled to the generator shaft 16 with a coupling element 14.

In other embodiments, where the drive train includes no gear box, the low speed shaft is transmitting torque directly to a low speed, direct driven multi pole generator.

As the speed of the turbine rotor low-speed shaft 8 fluctuates, the frequency of the output of the generator 18 also varies. In one implementation of the above embodiment, the transient overload capability of the wind turbine electrical and mechanical systems at full load is utilized by decreasing blade pitch and/or turbine speed to transiently increase power. The degree and duration of this overload are managed such that undue stress on the mechanical and electrical system components is avoided.

In one exemplary embodiment, the generator 18 is coupled to wind turbine controls 22. The wind turbines control 22 receives signals 20 from the generator that are representative of the operating parameters of the generator. The wind turbine controls 22 in response may generate control signals, for example a pitch signal 24 to change the pitch of the blades 6.

The wind turbine controls 22 are also coupled to a converter 34. The input 48 from the wind turbine controls 44 is supplied as input 48 to the controller 30. The input 26 from the controller 30 is supplied to the converter 34. The converter 34 typically includes power electronics components to convert the variable frequency output 36 of the generator 18 into a fixed frequency output 37 for supply to a utility system or a power grid 62. The wind turbine controls 22, controller 30 and converter 34 are described in more detail with reference to FIG. 2.

The controller 30 is configured for modulating flow of power through the converter 34. The controller 30 receives grid data from a grid measuring device GMD 2 52. The grid measuring device is measuring grid data, such as power and current at the output terminals of a synchronous generator 48. The measurement signal 56 is transmitted to the controller 30 by communication means. The measurement signal 56 may be representative of the synchronous generator control parameters, for example frequency or power including response to utility system frequency disturbances or power swings.

A power reference input signal 44 for the controller 30 is supplied by synchronous generator controls 42. The Synchronous generator controls is in an embodiment of the invention used for ensuring stabilization and restoration of the grid frequency. A grid measurement device (GMD1) 38 is connected to the synchronous generator in order to measure the output power and response of the wind turbines for control purposes. The synchronous generator control 42 is connected to the synchronous generator 48 for controlling the generator 48. The synchronous generator 48 is operated substantially in a manner similar to the operation of synchronous generators applied at large hydro or thermal power plants.

The synchronous generator 48 is connected to the grid via a grid filter 58. The grid filter 58 may comprise filter elements that effectively isolates the grid measuring device 52 from measuring any feedback from other elements on the utility system 62, e.g. from the converter 34. The grid filter 58 may allow the utility system fundamental frequency voltage waveform to pass from the utility system 62 to the synchronous generator 48 to ensure an inertia response to a frequency disturbance on the utility system.

FIG. 2 is a diagrammatic illustration of an exemplary control loop employed in the controller 100 The controller 100 provides an input signal 116 to the converter (shown in FIG. 1), which input signal may comprise a power or torque signal and is denoted generally by reference numeral 116 and symbol P. It may be noted that power and torque are used interchangeably in the description herein. As discussed in more detail below, the input signal P is typically a function of the signal P demand signal 110 from the wind turbine controls and measurement signal 104 that is measured at grid measuring device (shown in FIG. 1).

The measured signal 104 represents the active power response measured at the output terminals of the synchronous generator. The signal denoted by reference 08 and symbol ΔP is multiplied by a scaling factor that represents the ratio in rated power between the wind turbine generator and the synchronous generator. The measurement signal 104 is expected to lead to an increase or decrease in power output of the wind turbine system to stabilize the overall utility system. The difference between the signal 104 and the signal 102 is zero when the synchronous generator is in steady-state condition e.g. when the utility system frequency and voltage is inside the control limits during the steady-state condition.

Under transient conditions, if the system frequency is decreasing then the signal 108 need to be increased in positive direction to enhance stable operation. Similarly, if the system frequency is increasing then the signal 108 need to be increased in negative direction to enhance stable operation of the utility system. Further, the supplemental input signal 108 may be continuous or discrete and may be implemented as a closed or open loop function, subject to certain system limits as discussed below.

Referring back to FIG. 2, a torque or power demand signal 110 from wind turbine controls may also be provided as an input to the controller 100. The signal 108 and the command signal 110 may be summed in the summation element 109. The Converter typically includes a local converter controller (shown in FIG. 1) for converting the inputs into converter switching signal commands.

The controller 100, as described above, uses a control technique that transiently increases or decreases power output as a function of the input signal 110 from the wind turbine controls and the input signal 104, representing the power flow from the synchronous generator to the utility system (not shown). The ΔP signal 108 to the summation point 109 represents the power offset that is added to the input signal 110 from the wind turbine controls. In the ΔP calculation routine 106 the, input signal 104 that is measured at the grid measuring device is compared with the power reference, input signal 102, from the synchronous generator controls. ΔP is calculated as the difference between input signal 102 and input signal 104. The calculated difference is multiplied by a scaling factor that represents the ratio between the rated power of the wind turbine generator and the rated power of the synchronous generator. The controller 100 is thus configured for modulating flow of power through the converter in response to frequency disturbances of the utility system.

A limit function 114 is additionally employed in an exemplary embodiment for limiting the power or torque signal 112. Although a single block 114 is illustrated for purposes of example, one or more functions or controllers may be used to implement limit function 114 if desired.

Limits are useful because, when the wind turbine generator is operating at or near rated power output, then an increase in power will tend to overload the generator and converter. The limits used by the limit function 114 may be absolute limits, time-dependent limits, or combinations thereof. Some non-limiting examples of the limits used by the limit function 114 include physical limitations on the wind turbine system, power limits, torque limits, ramp rate limits, energy limits, and rotor speed limits of the wind turbine generator. Examples of physical limits include thermal capability of the power conversion equipment, converter current limits and drive shaft mechanical stress. Examples of energy limits include energy storage and dissipative energy limits.

Further there may be specific upper limits and lower limits for system stability. An upper limit used by the limit function 114 is typically a function of one or more of the following: converter thermal conditions, loading history, time and even ambient temperature. The lower limit will tend to be symmetric compared to the upper limit, although it is not required to be so. Further the limit function can be a limit on the output of a control block, or a limit or deadband on the input to a control block. The deadband limit is type of limit where over some band around zero there is no action and beyond a threshold an action is required to accommodate the limit.

As a specific example, since the total energy balance on the wind turbine dictates the drive-train speed, the energy balance may be used to determine the limits as discussed herein. Power extracted from the turbine, beyond that supplied by wind induced torque, will slow the machine down. The total energy extracted is the integral of this power difference. Also, the turbine has a lower limit on speed, below which stall occurs. Thus, the total energy extracted must also be limited, so that a minimum speed is maintained, with some margin. In one example, a dynamic limit that is a function of the energy extracted may be used to address this aspect.

It will be well appreciated by those skilled in the art that the control technique described herein may be utilized in a system for wind farm management as well. Such a wind farm management system 200 is shown as an exemplary embodiment in FIG. 3. The wind farm management system 200 includes a wind farm 210 having wind turbines 212, 214, and 216 operable to supply electrical power to a utility system 218. It will be appreciated by those skilled in the art that three wind turbines are shown for the purpose of illustration only, and the number may be greater based on the geographical nature and power requirements of any particular region.

Wind turbines 212, 214, 216 include turbine rotors 220, 222, 224, each rotor having multiple blades, which drive rotors 220, 222, 224 respectively to produce mechanical power, which is converted, to electrical power by the generators 226, 228, and 230 respectively. Converters 250, 252, 254 are used to convert the variable frequency output from the generators 226, 228 and 230 respectively into a fixed frequency output. Power produced by generators 226, 228 and 230 may be coupled to a voltage distribution network (not shown), or a collector system (not shown), which is coupled to the utility system. In the illustrated embodiment, a feeder 240 is used to couple power outputs of wind turbine generators 226, 228 and 230. In a typical application, the voltage distribution network couples power from multiple feeders (not shown), each feeder coupling power outputs of multiple wind turbine generators.

In one exemplary embodiment, the wind farm 210 includes a wind farm supervisory controller 242. The supervisory controller 242 is configured to communicate with individual wind turbine controls 232, 234, 236 via communication links 244, which may be implemented in hardware, software, or both. In certain embodiments, the communication links 244 may be configured to remotely communicate data signals to and from the supervisory controller in accordance with any wired or wireless communication protocol known to one skilled in the art. The supervisory controller 242 receives input signals from synchronous generator controls 290 and the grid measuring device GMD2 260. The supervisory controller 242 is coupled to the wind turbine controls 232, 234, 236, and is configured for modulating flow of power through the converters 250, 252, 254 in response to utility system frequency disturbances or power swings. The functionality of the supervisory controller 242 will be similar to that of controller 100 described in reference to FIG. 2. In another embodiment, a plurality of controllers of the type shown in FIG. 1 is provided to modulate the flow of power through each respective converter. In further embodiment the wind turbine controls 232,234,236 is integrated part of a pitch and power control for the wind turbine.

It will be appreciated by those skilled in the art, that the wind turbine system has been referred in the above embodiments as an exemplary power generation and power management system coupled to the utility system. Aspects of present technique are equally applicable to other distributed generation sources operable to supply power to the utility system. Examples of such sources include fuel cells, micro turbines and photovoltaic systems. Such power managements systems will similarly include converters, each converter coupled to a respective generation source and the utility system, and an individual or supervisory controller coupled to the converters. As explained herein above, the controller includes an internal reference frame configured for modulating flow of power through the converters in response to frequency disturbances or power swings of the utility system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
a power generation unit responsive to a variable energy source, the power generation unit operable to supply electrical power to an utility system by way of a first circuit path including a power converter;
a synchronous machine coupled to the utility system by way of a second circuit path not including a power converter, the first circuit path and the second circuit path comprising a parallel circuit connection for the power generation unit and for the synchronous machine to the utility system, the synchronous machine having an inertial response to transient conditions in the utility system, the inertial response of the synchronous machine effective to utilize rotational kinetic energy in the synchronous machine for stabilizing the transient conditions;
a grid measurement device arranged for measuring a current and a power that are exchanged during the transient conditions of the utility system between the synchronous machine and the utility system in accordance with the inertial response of the synchronous machine, the power and the current exchanged between the synchronous machine and the utility system by way of the second circuit path;
a controller communicatively coupled to the grid measurement device and to the synchronous machine, the controller adapted for adjusting an output power of the power generation unit as a function of the exchanged power and current measured by the grid measurement device during the transient conditions of the utility system; and
a means of communication between the grid measurement device, controller and/or the power generation unit,
wherein the power generation unit is configured to supply an amount of current and power to the utility system by way of the first circuit path, the amount of current and power being supplied by the power generation unit to the utility system as a function of the power and the current that are exchanged during the transient conditions between the synchronous machine and the utility system, wherein the amount of current and power being supplied to the utility system by the power generation unit in combination with the exchanged power and current between the synchronous machine and the utility effective for reducing frequency deviation or power swings that occur during the transient conditions of the utility system.

2. The power generation system according to claim 1, wherein the power generation unit is selected from the group consisting of wind turbine generator, solar cell, fuel cell, micro turbine, and a wave power system.

3. The power generation system according to claim 1, wherein the synchronous machine is a micro synchronous machine.

4. The power generation system according to claim 1, wherein the power generation system comprises of a number of power generation units operated in parallel.

5. The power generation system according to claim 1, wherein the controller is further configured to provide a blade pitch control signal or a turbine speed control signal in response to a frequency disturbance or a power oscillation of the utility system as a function of the synchronous generator response to the utility system.

6. The power generation system according to claim 1, wherein an input signal for the controller comprises a torque or power signal and is a function of the synchronous generator response to the utility system.

7. The power generation system according to claim 1 further comprising a limit function configured for limiting a frequency of power flow modulation, a supplemental power or torque signal, or combinations thereof.

8. The power generation system according to claim 7, wherein the limit function comprises limits that are operable as a function of at least one of a physical limitation on the power generation system such as a power limit, a torque limit, a current limit, an energy limit, or a speed limit.

9. The power generation system according to claim 1, wherein the power generation system comprises of a wind turbine generator, which wind turbine generator comprises of a doubly fed asynchronous generator or a generator for use with a full converter.

10. The power generation system of according to claim 1, further comprising an energy storage element, an energy consumer element or combinations thereof, wherein the energy storage element, the energy consumer element or the combinations thereof are coupled to a converter.

11. The power generation system according to claim 1, wherein the main shaft of the synchronous machine is coupled to a motor.

12. The power generation system according to any claim 1, wherein the synchronous machine is connected to control means in order for the synchronous machine to generate or absorb reactive power.

13. A method in a power generation system comprising:
generating power in a power generation unit responsive to a variable energy source;
supplying power from the power generation unit to an utility system by way of a first circuit path including a power converter;
coupling a synchronous machine to the utility system by way of a second circuit path not including a power converter;
forming with the first circuit path and the second circuit path a parallel circuit connection for the power generation unit and the synchronous machine to the utility system;
arranging the synchronous machine to provide an inertial response to transient conditions in the utility system, the inertial response of the synchronous machine effective to utilize rotational kinetic energy in the synchronous machine for stabilizing the transient conditions in the utility system;
measuring with a grid measurement device a current and a power that are exchanged during the transient conditions between the synchronous machine and the utility system in accordance with the inertial response of the synchronous machine;
adjusting an output power of the power generation unit as a function of the exchanged power and current that are measured by the grid measurement device;
modulating in the power generation system a flow of power from the power generation unit to the utility system as a function of the power and current exchanged during the transient conditions between the synchronous machine and the utility system, the flow of power from the power generation unit to the utility system in combination with the current and power exchanged between the synchronous machine and the utility system effective for reducing frequency deviation or power swings that occur during the transient conditions in the utility system.

14. The method of claim 13 further comprising adjusting the output power based on the rate of change of the frequency of the power and/or current measurements.

15. The method of claim 13, wherein the power generation unit comprises a wind turbine generator, wherein an adjusting of the output power of the wind turbine generator comprises changing a blade pitch or a turbine speed of the wind turbine generator.

16. The method of claim 13 further comprising modulating flow of power in at least one an energy storage element or an energy consumer element in response to frequency disturbances or power swings of the utility system.

17. The method according to claim 13, further comprising coupling a motor to a main shaft of the synchronous machine.

18. The method according to claim 13, wherein the adjusting of the output power of the power generation unit comprises a limiting function comprising limits that are operable as a function of at least one of a physical limitation on the power generation system, comprising a power limit, a torque limit, a current limit, an energy limit, or a speed limit.

19. The method according to claim 13, wherein the synchronous machine comprises a micro synchronous machine having a high inertia constant.

* * * * *